UNITED STATES PATENT OFFICE.

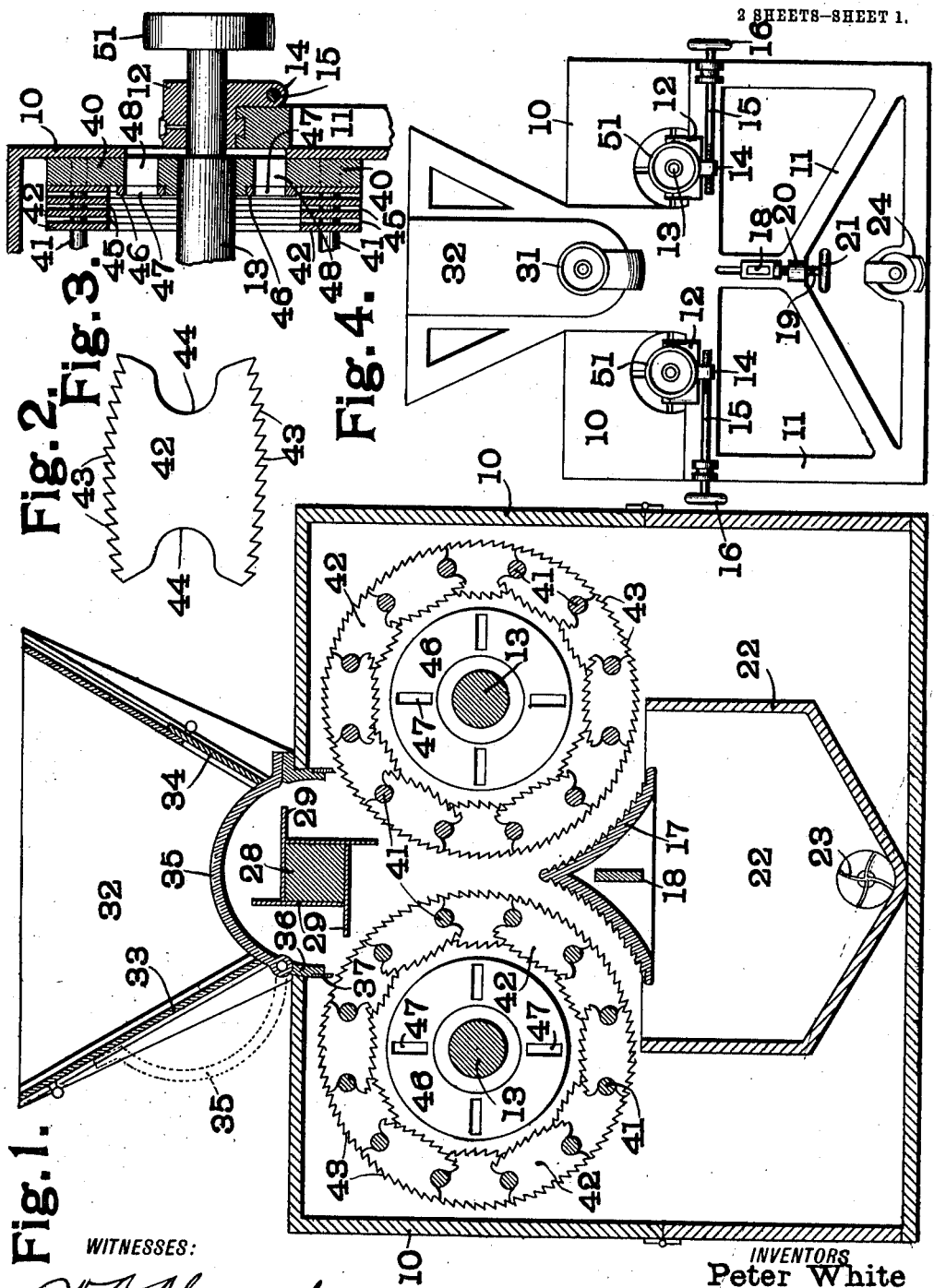

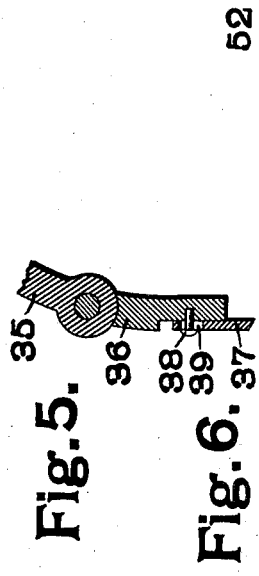

PETER WHITE AND JOHN SHEPARD WHITE, OF ST. LOUIS, MISSOURI.

COTTON-SEED DELINTER AND GIN.

1,020,787.  Specification of Letters Patent.  Patented Mar. 19, 1912.

Application filed March 6, 1911. Serial No. 612,510.

*To all whom it may concern:*

Be it known that we, PETER WHITE and JOHN SHEPARD WHITE, both citizens of the United States of America, residing at the city of St. Louis, State of Missouri, have invented a certain new and useful Cotton-Seed Delinter and Gin, of which the following is such a full, clear, and exact description as will enable any one skilled in the art to which it appertains to make and use the same, reference being had to the accompanying drawings, forming part of this specification.

Our invention relates to a cotton seed delinter which may be adapted for use as a gin by a slight adjustment of the parts.

Our invention also relates to the particular manner of forming the toothed rolls for use in such delinter and gin.

Our invention also relates to various other novel features and details of construction all of which are described in the following specification and pointed out in the claims annexed hereto.

In the accompanying drawings which illustrate one form of apparatus made in accordance with our invention, Figure 1 is a vertical cross section; Fig. 2 is an enlarged detailed view of one of the blades of which the rolls are formed; Fig. 3 is a longitudinal section through one end of one of the rolls and the parts adjacent thereto; Fig. 4 is an elevation on a reduced scale of one end of the apparatus; Fig. 5 is an enlarged sectional view showing a detail of construction; Fig. 6 is a vertical longitudinal section through the center of the apparatus; Fig. 7 is an enlarged detailed view of a portion of one of the rolls and Fig. 8 is an elevation looking at the opposite end from Fig. 4.

Like marks of reference refer to similar parts in the several views in the drawings.

10 represents the casing of the machine. This casing 10 is provided at its ends with frame-work 11. Slidingly mounted upon the frame-work 11 are boxes 12 in which are journaled shafts 13 upon which are mounted the toothed rolls which will be hereinafter described in detail.

In order to adjust the rolls toward and away from each other the bearings 12 are provided on their lower faces with lugs 14 engaged by screw-threaded rods 15 provided at their outer ends with hand wheels 16. Arranged between the two rolls is a double concave 17 carried upon a cross bar 18. This cross bar 18 is supported at its ends by screw-threaded rods 19 carried in lugs 20 on the frame-work 11 and provided with hand wheels 21, by means of which they may be turned to raise and lower the bar 18 and thus adjust the concave 17 toward and away from the rolls. Arranged directly below the concave 17 within the casing 10 is a receiver 22 for the cotton seed. This receiver 22 is preferably provided at its bottom with a spiral conveyer 23 for discharging the cotton seed from the machine through a spout 24, as shown in Figs. 4 and 6. The conveyer 23 may be driven by a pulley 25 mounted upon its shaft, as shown in Fig. 6.

In order to feed the cotton to the rolls we arrange between the upper parts of the rolls a float shaft 28 provided with blades 29 and journaled in bearings 30 carried by the frame-work 11. The float shaft 28 may be driven by means of a pulley 31 upon the said shaft, as shown in Figs. 4 and 6. Arranged directly above the float shaft 28 is a hopper 32 provided at one side with a large sliding door 33 and at the other with smaller sliding door 34. These sliding doors 33 and 34 allow a hinged cover 35 to be thrown either into the position shown in full lines in Fig. 1 so as to separate the hopper from the float shaft 28 or into the position shown in dotted lines, so as to allow the material to be fed from the hopper to the float shaft. At each edge of the cover 35 the apparatus is provided with a downwardly projecting portion 36 to which is secured a blade 37. This blade 37 is secured in position by means of screws 38 passing through slots 39, as shown in Fig. 5 so that the said blade 37 may be adjusted toward and away from the toothed rolls.

The construction of our toothed rolls will now be described in detail. Each of the rolls consists of a pair of cylindrical end pieces 40, as shown in Figs. 3 and 6. Carried by these end pieces 40 are a number of rods 41 upon which are mounted blades 42. These blades 42 are shown in detail in Fig. 2. Each of the blades are provided at opposite sides with teeth 43 formed of the arc of a circle and at each end the blade is provided with a recess 44 adapted to engage with the rods 41. The blades thus overlap as is best shown in Fig. 7 and spaces 45 are left between the blades for the passage of air to disengage the cotton from the teeth. The roll being built up of these blades 42 is hollow in its interior and the air contained therein will be forced out through the passages 45 by centrifugal force so as to disengage the cotton from the teeth. In order to regulate the flow of air through the passages 45 we provide the end pieces 40 with disks 46 provided with openings 47 adapted to be brought into registry with openings 48 in the end pieces 40. These disks 46 are secured in position by means of screws 49 passing through slots 50 in the end pieces 40, as shown in Fig. 6, so that the said disks may be rotated to bring the openings 47 into or out of registry with the openings 48 so as to regulate the flow of air into the interior of the rolls. The rolls are driven by means of pulleys 51 mounted upon the shafts 13.

In order to feed the cotton to the rolls when the cover 35 is in the position shown in Fig. 1, we provide at one end of the hopper 32 a chute 52, as shown in Fig. 6, and mount upon the end of the float shaft 28, a worm wheel 53 adapted to feed the cotton seed in the direction of the length of the float shaft 28 and the main rolls.

The operation of our apparatus is as follows: When it is desired to use the apparatus as a gin the concave 35 is thrown back into the position shown in dotted lines and the cotton is fed into the hopper 32. The cotton wraps around the float shaft 28 as it is rotated and thus forms a roll which is presented against the teeth of the ginning rolls. The blades 37 are so adjusted as to prevent the passage of the cotton seed between themselves and the toothed rolls. The double concave 17 is adjusted to such a distance from the toothed rolls as to allow the cotton seed covered by the short cotton fiber to pass down into the receiver 22. The cotton separated from the seed by the action of the teeth 43 will be blown from the teeth by means of the current of air passing between the blades and will be deposited in the main casing 10. Inasmuch as our rolls are provided with flat teeth and the teeth do not pass between slots as in the ordinary gin, our gin does not injure the fiber of the cotton.

When it is desired to use the apparatus as a cotton seed delinter the cover 35 is moved into the position shown in full lines in Fig. 1 thus closing the hopper 22. The cotton seed containing the short fiber is now fed down the chute 52 and is forced along the float shaft 28 by means of the worm 53. When the apparatus is used as a delinter the double concave 17 is raised until it is so close to the toothed rolls that the cotton seed can only pass between the two parts when all the fiber is removed.

The blades 42 forming the toothed rolls of our apparatus may be stamped out of sheet steel and afterward hardened. In this way a very cheap and comparatively light roll is formed. At the same time the blades after becoming dull on one side may be reversed thus practically securing two rolls for the cost of manufacture of one.

Having fully described our invention what we claim as new and desire to secure by Letters Patent of the United States, is:

1. In a cotton seed delinter or the like, the combination with a pair of toothed rolls, of means for adjusting said rolls toward and away from each other, a toothed double concave coöperating with the said rolls to allow the passage of the seed, and means for adjusting said concave.

2. In a cotton seed delinter or the like, the combination with a pair of toothed rolls, of means for feeding material in a direction at right angles to the axis of said rolls, and other means for feeding material in the direction of the axis of said rolls.

3. In a cotton seed delinter or the like, the combination with a pair of toothed rolls, of a chute adapted to deliver the cotton to said rolls in a direction at right angles to the axis of the rolls, a second chute adapted to deliver the cotton to said rolls in the direction of the axis of the rolls, and a cover for closing said first-named chute.

4. In a cotton seed delinter or the like, the combination with a pair of toothed rolls, of a float shaft for presenting the cotton to said rolls, a hopper for feeding the cotton to said float shaft, a chute, a worm for feeding the cotton from said chute in the direction of the axis of said float shaft, and a cover for closing said hopper.

5. In a cotton seed delinter or the like, the combination with a pair of toothed rolls, of a double concave arranged at one side of said rolls and coöperating therewith to allow the passage of the seed, and a float shaft arranged at the other side of said rolls.

6. In a cotton seed delinter or the like, the combination with a pair of toothed rolls, of a double toothed concave arranged at one side of said rolls and coöperating therewith to allow the passage of the seed, and a float shaft arranged at the other side of said rolls.

7. In a cotton seed delinter or the like, the combination with a pair of toothed rolls, of a double toothed concave arranged at one side of said rolls and coöperating therewith to allow the passage of the seed, means for adjusting said concave toward and away from said rolls, and a float shaft arranged at the other side of said rolls.

8. In a cotton seed delinter or the like, the combination with a pair of toothed rolls, of a double toothed concave arranged at one side of said rolls, a float shaft arranged at the other side of said rolls and coöperating therewith to allow the passage of the seed, a movable cover for said float shaft, and a worm for feeding cotton in the direction of the axis of said float shaft.

9. In a cotton seed delinter or the like, the combination with a pair of toothed rolls, of a double concave arranged at one side of said rolls and coöperating therewith to allow the passage of the seed, means for adjusting said concave toward and away from said rolls, means for adjusting the distance between said rolls, and a float shaft arranged at the other side of said rolls.

10. In a cotton seed delinter or the like, the combination with a pair of toothed rolls, of a double concave arranged at one side of said rolls and coöperating therewith to allow the passage of the seed, means for adjusting said concave toward and away from said rolls, means for adjusting each of said rolls toward and away from the other, and a float shaft arranged at the other side of said rolls.

11. In a cotton seed delinter or the like, the combination with a hollow toothed roll provided with apertures in its periphery for the passage of air to remove the cotton from its teeth, and means arranged at the end of the roll for regulating the passage of air to the interior of said roll.

12. In a cotton seed delinter or the like, the combination with a roll comprising a plurality of over-lapping toothed blades provided with intervening air spaces, of means arranged at the end of the roll for regulating the passage of air to the interior of said roll.

In testimony whereof, we have hereunto set our hands and affixed our seals in the presence of the two subscribing witnesses.

PETER WHITE. [L. S.]
JOHN SHEPARD WHITE. [L. S.]

Witnesses:
  W. A. ALEXANDER,
  ELIZABETH BAILEY.